(12) United States Patent
Krasnov et al.

(10) Patent No.: US 7,743,630 B2
(45) Date of Patent: Jun. 29, 2010

(54) METHOD OF MAKING FLOAT GLASS WITH TRANSPARENT CONDUCTIVE OXIDE (TCO) FILM INTEGRALLY FORMED ON TIN BATH SIDE OF GLASS AND CORRESPONDING PRODUCT

(75) Inventors: Alexey Krasnov, Canton, MI (US); Ksenia A. Landa, Brownstown, MI (US); Leonid M. Landa, Brownstown, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 1327 days.

(21) Appl. No.: 11/194,729

(22) Filed: Aug. 2, 2005

(65) Prior Publication Data

US 2006/0248923 A1    Nov. 9, 2006

Related U.S. Application Data

(63) Continuation-in-part of application No. 11/122,218, filed on May 5, 2005.

(51) Int. Cl.
*C03B 18/00* (2006.01)
*C03B 18/02* (2006.01)
*C03C 17/00* (2006.01)
*C03C 17/06* (2006.01)
*C03C 17/23* (2006.01)

(52) U.S. Cl. ............... 65/60.53; 65/60.1; 65/60.5; 65/99.1; 65/99.2; 65/99.3

(58) Field of Classification Search ............. 65/60.1, 65/60.5, 60.53, 99.1–99.4
See application file for complete search history.

(56) References Cited

U.S. PATENT DOCUMENTS

| | | | |
|---|---|---|---|
| 3,083,551 A | | 4/1963 | Pilkington |
| 3,220,816 A | | 11/1965 | Pilkington |
| 3,752,701 A | * | 8/1973 | Morrissey .................. 257/794 |
| 3,753,674 A | | 8/1973 | Ohlberg et al. |
| 3,954,432 A | * | 5/1976 | Hummel et al. ............... 65/27 |
| 3,984,591 A | * | 10/1976 | Plumat et al. ............... 427/165 |

(Continued)

FOREIGN PATENT DOCUMENTS

EP    0 413 254    2/1991

(Continued)

OTHER PUBLICATIONS

U.S. Appl. No. 11/122,218, filed May 5, 2005.

(Continued)

*Primary Examiner*—Khanh Nguyen
*Assistant Examiner*—Carson Gross
(74) *Attorney, Agent, or Firm*—Nixon & Vanderhye P.C.

(57) ABSTRACT

A method of making float glass is provided that results in a transparent conductive oxide (TCO) films being integrally formed with the float glass at the tin side thereof. In particular, a donor(s) such as antimony and/or an oxide thereof is added to the glass batch during the process of manufacture. The donor diffuses into the tin oxide inclusive layer adjacent the tin bath during the "float" manufacturing process, thereby increasing the number of electrons in the tin oxide inclusive layer so as to form a TCO film at the tin side of the glass.

12 Claims, 2 Drawing Sheets

U.S. PATENT DOCUMENTS

| | | |
|---|---|---|
| 4,162,907 A | 7/1979 | Anderson |
| 4,473,612 A * | 9/1984 | Behr et al. .................. 428/213 |
| 5,221,352 A | 6/1993 | Terneu et al. |
| 5,304,499 A | 4/1994 | Bonnet et al. |
| 5,387,433 A | 2/1995 | Balian et al. |
| 5,599,754 A * | 2/1997 | Maeda et al. .................. 501/70 |
| 5,773,086 A * | 6/1998 | McCurdy et al. ....... 427/255.19 |
| 5,780,149 A * | 7/1998 | McCurdy et al. ............ 428/336 |
| 5,922,142 A | 7/1999 | Wu et al. |
| 6,169,246 B1 | 1/2001 | Wu et al. |
| 6,221,495 B1 | 4/2001 | Wu et al. |
| 6,251,701 B1 | 6/2001 | McCandless |
| 6,436,541 B1 * | 8/2002 | Sopko et al. .................. 428/432 |
| 6,602,606 B1 * | 8/2003 | Fujisawa et al. ............ 428/432 |
| 6,645,843 B2 | 11/2003 | Kim et al. |
| 6,711,917 B2 | 3/2004 | Landa et al. |
| 6,787,253 B2 * | 9/2004 | Iwabuchi et al. ............ 428/698 |
| 6,827,970 B2 * | 12/2004 | Varanasi et al. ............. 427/166 |
| 7,169,722 B2 * | 1/2007 | Landa et al. ................... 501/71 |
| 7,462,988 B2 * | 12/2008 | Kim ............................. 313/585 |
| 2004/0121896 A1 * | 6/2004 | Landa et al. ................... 501/71 |
| 2005/0188725 A1 * | 9/2005 | Tullman et al. ............ 65/134.3 |

FOREIGN PATENT DOCUMENTS

| | | |
|---|---|---|
| EP | 1 118 597 | 7/2001 |
| JP | 08-026767 | 1/1996 |
| JP | 11-298030 | 10/1999 |
| JP | 2003-095691 | 4/2003 |
| WO | WO 95/13993 | 5/1995 |
| WO | WO 2006/121601 | 11/2006 |

OTHER PUBLICATIONS

International Search Report dated Nov. 23, 2006.

* cited by examiner

METHOD OF MAKING FLOAT GLASS WITH TRANSPARENT CONDUCTIVE OXIDE (TCO) FILM INTEGRALLY FORMED ON TIN BATH SIDE OF GLASS AND CORRESPONDING PRODUCT

This application is a continuation-in-part (CIP) of U.S. patent application Ser. No. 11/122,218, filed May 5, 2005, the disclosure of which is hereby incorporated herein by reference.

This invention relates to a method of making float glass, and a resulting float glass made from such a method. In certain example embodiments of this invention, a compound including donor properties in respect to tin oxide (e.g., antimony oxide) is added to the glass batch for the melt stage of the glass manufacturing process. The hot glass ribbon with the donor therein is then drawn onto the tin bath during the "float" process. The donor diffuses into the tin oxide inclusive film or layer that is integrally formed at the glass surface which interfaces with the tin bath thereby changing the electrical properties of this film/layer (e.g., increases the number of electrons, thus increasing conductivity) causing it to be a transparent conductive oxide (TCO). Float glass made in such a manner so as to include a TCO film integrally formed therein can be used in applications such as solar cells, oven doors, defrosting windows, or the like.

BACKGROUND AND SUMMARY OF EXAMPLE EMBODIMENTS OF THE INVENTION

The use of transparent conductive oxide (TCO) films on glass is known in the art. Such TCO films on glass are typically deposited pyrolitically (via pyrolysis) which requires expensive equipment and processing (i.e., large capital investments).

The process of making float glass is known in the art. For example, see U.S. Pat. Nos. 3,954,432, 3,083,551, and 3,220,816, the disclosures of all of which are hereby incorporated herein by reference. Generally speaking, the process of making float glass involves delivering molten glass to a pool of molten tin (which forms a so-called tin bath) in a forming chamber. Shortly after the initial delivery, the applied tractive forces in withdrawing the glass from the forming chamber attenuate the glass while it is cooling to form a continuous sheet of a ribbon of glass of a desired, predetermined, shape and thickness which is continuously advanced over the bath of molten tin. Pyrolytic coatings are typically applied to the upper surface of the glass after it exits the tin bath, on the non-tin-bath side of the glass.

It will be appreciated that there exists a need in the art for a method of forming TCO films which is less costly than known pyrolysis techniques.

In certain example embodiments of this invention, a TCO film is integrally formed along with the float glass during the float glass manufacturing process. In certain example embodiments of this invention, a compound including donor properties in respect to tin oxide (e.g., antimony and/or an oxide thereof) is added to the glass batch for the melt stage of the glass manufacturing process. The hot glass ribbon with the donor therein proceeds onto the tin bath during the "float" process. A thin tin oxide inclusive film forms in the glass at the side of the glass having the interface with the tin bath during the float process (i.e., at the bottom surface of the hot glass ribbon which lays on the tin bath). The donor diffuses into the tin oxide inclusive film that is integrally formed at the glass surface which interfaces with the tin bath, thereby changing the electrical properties of this tin oxide inclusive film/layer (e.g., increases the number of electrons, thus increasing conductivity) causing the tin oxide inclusive layer to be a transparent conductive oxide (TCO) film or layer integrally formed with the float glass. In particular, the donor element(s) diffuses into the tin oxide inclusive layer area of the glass thereby increasing the number of electrons therein, which results in a higher conductivity of the layer.

Float glass made in such a manner so as to include a TCO film integrally formed therein can be used in applications such as solar cells, oven doors, defrosting windows, or the like in certain example embodiments of this invention.

In certain example embodiments of this invention, the donor material may be Sb (antimony) and/or $Sb_2O_3$ as a dopant for the tin oxide inclusive layer integrally formed with the float glass. However, other donor dopants may instead or additionally be used. The antimony will dope the naturally formed $SnO_x$ (e.g., $0 \leq x \leq 1$) on the tin side of the glass, thereby producing a transparent conductive oxide film at this side of the float glass. Thus, an economical way has been found to produce a TCO layer at the tin side of the float glass by adding an amount of antimony and/or other dopant to the batch during the process of manufacturing the glass. In certain example embodiments of this invention, an example Sb and/or $Sb_2O_3$ dopant may make up from about 0.01 to 10% by weight of the glass batch and/or final glass, more preferably from about 0.1 to 5%, and most preferably from about 1 to 5%.

In certain example embodiments of this invention, there is provided a method of making float glass, the method comprising: providing a glass batch including soda, lime, silica and antimony; causing molten glass from the batch to be provided on a top surface of a tin bath, thereby causing a tin oxide inclusive film to be formed at the glass surface adjacent the tin bath; and wherein the presence of antimony increases the number of electrons in the tin oxide inclusive film formed at the glass surface so as to result in the formation of a transparent conductive oxide film at the glass surface that was adjacent the tin bath.

In other example embodiments of this invention, there is provided a method of making float glass, the method comprising: melting a glass batch including $SiO_2$, $Na_2O$, CaO and at least one electron donor; and locating a hot ribbon from the glass batch on a tin bath, so that a tin oxide inclusive layer is formed, and electrons are donated to the tin oxide inclusive layer by the donor, so as to provide a transparent conductive oxide film at a tin side of resulting float glass.

In still further example embodiments of this invention, there is provided float glass comprising: $SiO_2$ 67-75%, $Na_2O$ 10-20%, CaO 5-15%, wherein a transparent conductive oxide film is integrally formed with the float glass at a tin side thereof. The conductive oxide film may be formed with the help of at least one donor added to the glass batch.

IN THE DRAWINGS

DETAILED DESCRIPTION OF CERTAIN EXAMPLE EMBODIMENTS OF THIS INVENTION

Figure 1:
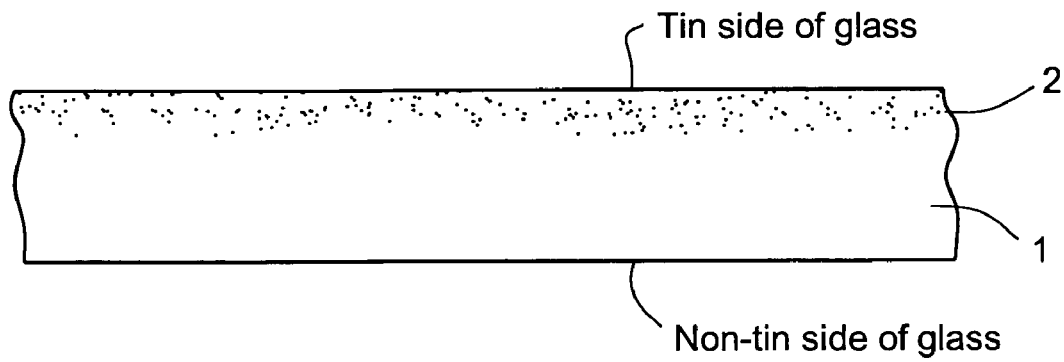
FIG. 1 is a cross sectional view of float glass including a transparent conductive oxide layer integrally formed therewith according to an example embodiment of this invention.

Referring now more particularly to the accompanying drawings in which like reference numerals indicate like parts/layers/elements throughout the several views.

FIG. 1 is a cross sectional view of float glass according to an example embodiment of this invention. In certain example embodiments of this invention, a transparent conductive oxide (TCO) film 2 is integrally formed along with the float glass 1 during the float glass manufacturing process. In certain example embodiments of this invention, a compound including donor properties (e.g., antimony and/or an oxide thereof) is added to the glass batch for the melt stage of the glass manufacturing process. The hot glass ribbon with the donor therein proceeds onto the tin bath during the "float" process. A thin tin oxide inclusive film 2 forms in the glass 1 at the side of the glass having the interface with the tin bath during the float process (i.e., at the bottom surface of the hot glass ribbon which lays on the tin bath). This TCO film 2 is represented by the dots in FIG. 1. The donor (e.g., antimony and/or oxide thereof) diffuses into the tin oxide inclusive film that is integrally formed at the glass surface which interfaces with the tin bath, thereby changing the electrical properties of this tin oxide inclusive film/layer (e.g., increases the number of electrons, thus increasing conductivity) causing the tin oxide inclusive layer 2 to be a transparent conductive oxide film or layer integrally formed with the float glass 1. In particular, the donor element(s) diffuses into the tin oxide inclusive layer area of the glass thereby increasing the number of electrons therein, which results in a higher conductivity of the layer 2.

Float glass made in such a manner as shown in FIG. 1 so as to include a TCO film 2 integrally formed therein can be used in applications such as solar cells, oven doors, defrosting windows, or the like in certain example embodiments of this invention.

In certain example embodiments of this invention, the donor material may be Sb (antimony) and/or $Sb_2O_3$ as a dopant for the tin oxide inclusive layer 2 integrally formed with the float glass 1. However, other donor dopants may instead or additionally be used. The antimony will dope the naturally formed $SnO_x$ (e.g., $0 \leq x \leq 1$) on the tin side of the glass 1, thereby producing a transparent conductive oxide film 2 at this side of the float glass. Thus, an economical way has been found to produce a TCO layer 2 of or including $SnO_x$:Sb at the tin side of the float glass by adding an amount of antimony and/or other dopant to the batch during the process of manufacturing the glass.

Antimony may be added to the glass batch in any suitable form. For example and without limitation, antimony may be added to the glass batch in the form of one or more of $Sb_2O_3$, $NaSbO_3$, $Sb(Sb_2O_5)$, and/or metallic Sb. The use of the term antimony oxide herein means antimony in any possible oxidation state, and is not intended to be limiting to any particular stoichiometry.

In certain example embodiments of this invention, an example Sb and/or $Sb_2O_3$ dopant may make up from about 0.01 to 10% by weight of the glass batch and/or final glass, more preferably from about 0.1 to 5%, and most preferably from about 1 to 5%.

Figure 2:
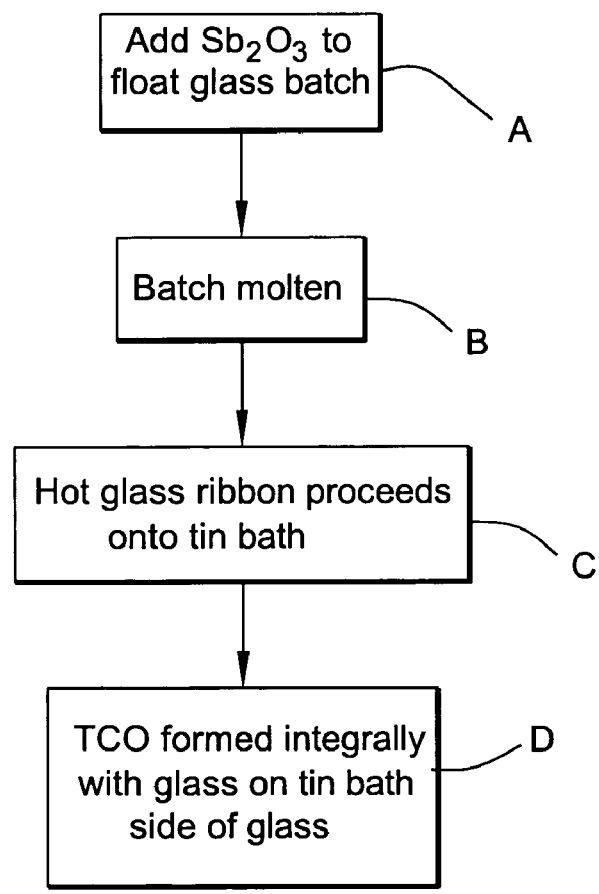
FIG. 2 is a flowchart illustrating a process for making float glass according to an example embodiment of this invention.

FIG. 2 is a flowchart illustrating example steps carried out in making float glass according to an example embodiment of this invention. Initially, the glass batch is put together so as to include soda, lime and silica components, and optionally colorant(s) such as iron and/or the like. An electron donor such as Sb and/or an oxide thereof is provided in the glass batch (step A in FIG. 2). The batch is melted in a typical furnace or melter so as to provide molten glass containing the components of the batch ingredients, including the donor element(s) (step B in FIG. 2). The molten glass ribbon then proceeds from the melter and is provided on the upper surface of a so-called tin bath which is a pool of molten tin metal (step C in FIG. 2).

Because of forming the glass on molten tin of the tin bath in certain example embodiments of this invention, small amounts of tin and/or tin oxide from the tin bath migrates into surface areas of the glass 1 on the side that was in contact with the tin bath during manufacture. This is called the tin side of the glass. Moreover, donor element(s) such as antimony migrates from the glass into this same surface area and bonds with the tin and/or tin oxide to form the TCO layer or film 2 comprising $SnO_x$:Sb at the tin side of the float glass 1 (step D in FIG. 2).

Figure 3:
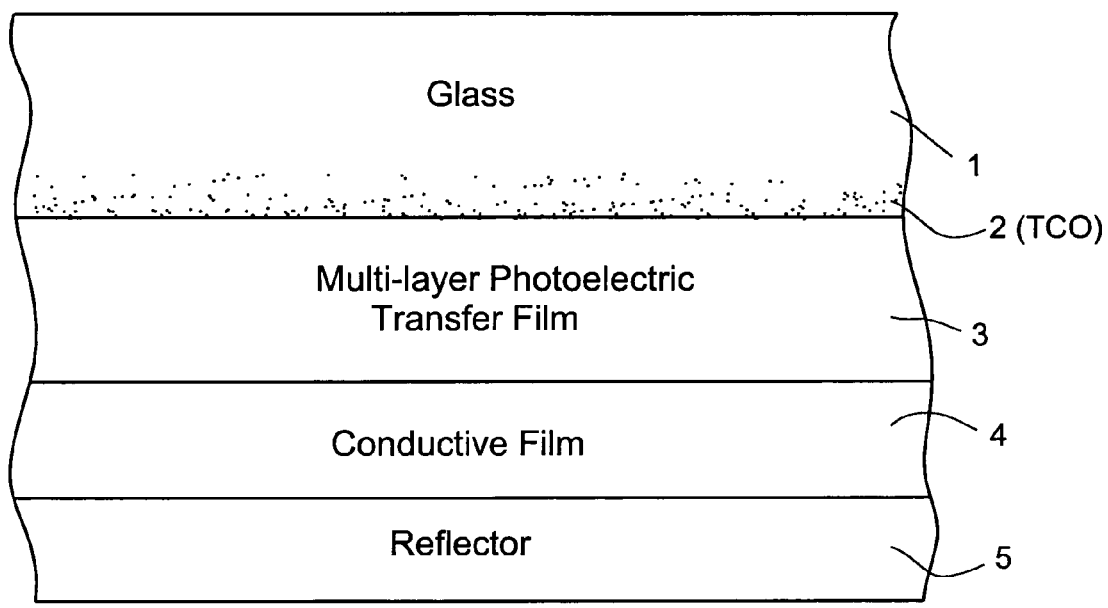
FIG. 3 is a cross sectional view of a solar cell according to an example embodiment of this invention, the solar cell including the float glass of FIGS. 1 and/or 2.

FIG. 3 is a non-limiting example of how a glass substrate 1 including a TCO film 2 formed integrally therewith, per FIG. 1 and/or FIG. 2, can be used. In the FIG. 3 example embodiment, a solar cell is illustrated in cross section in FIG. 1. The solar cell includes, for example and without limitation, high transmission glass substrate 1 which includes integrally formed therewith transparent conductive oxide (TCO) film 2, a photoelectric transfer film 3 which may include one or more layers, a rear surface electrode 4, and an optional reflector 5. In certain example embodiments, the photoelectric transfer film 3 may include a p-type silicon inclusive layer, an i-type silicon inclusive layer, and an n-type silicon inclusive layer. These silicon inclusive layers may be composed of amorphous silicon or any other suitable type of semiconductor with suitable dopants in certain example embodiments of this invention. The electrode 4 may be of a transparent conductor such as zinc oxide, or any other suitable material in certain example embodiments of this invention, and the reflector 5 may be of aluminum, silver or the like.

Certain glasses for substrate 1 according to example embodiments of this invention utilize soda-lime-silica flat glass as their base composition/glass. In addition to base composition/glass, a colorant portion may be provided in order to achieve a glass that is fairly clear in color and/or has a high visible transmission. An exemplary soda-lime-silica base glass according to certain embodiments of this invention, on a weight percentage basis, includes the following basic ingredients:

TABLE 1

EXAMPLE BASE GLASS

| Ingredient | Wt. % |
|---|---|
| $SiO_2$ | 67–75% |
| $Na_2O$ | 10–20% |
| CaO | 5–15% |
| MgO | 0–7% |
| $Al_2O_3$ | 0–5% |
| $K_2O$ | 0–5% |

Other minor ingredients, including various conventional refining aids, such as $SO_3$, carbon, and the like may also be included in the base glass. In certain embodiments, for example, glass herein may be made from batch raw materials silica sand, soda ash, dolomite, limestone, with the use of sulfate salts such as salt cake ($Na_2SO_4$) and/or Epsom salt ($MgSO_4 \times 7H_2O$) and/or gypsum (e.g., about a 1:1 combination of any) as refining agents. In certain example embodiments, soda-lime-silica based glasses herein include by weight from about 10-15% $Na_2O$ and from about 6-12% CaO.

In addition to the base glass (e.g., see Table 1 above), in making float glass according to certain example embodiments of the instant invention when high transmission is desired (e.g., for example solar cell applications), the glass batch may include materials (including colorants and/or oxidizers) which cause the resulting glass to be fairly neutral in color, permit formation of the TCO, and/or allow the glass to have a high visible light transmission. These materials may either be present in the raw materials (e.g., small amounts of iron), or may be added to the base glass materials in the batch (e.g., antimony and/or the like). In certain example non-limiting embodiments of this invention, the resulting glass has visible transmission of at least 75%, more preferably at least 80%, even more preferably of at least 85%, and most preferably of at least about 90% (sometimes at least 91%) (Lt D65). In certain example non-limiting instances, such high transmissions may be achieved at a reference glass thickness of about 3 to 4 mm In certain embodiments of this invention, in addition to the base glass, the glass and/or glass batch comprises or consists essentially of materials as set forth in Table 2 below (in terms of weight percentage of the total glass composition):

TABLE 2

EXAMPLE ADDITIONAL MATERIALS IN GLASS

| Ingredient | General (Wt. %) | More Preferred | Most Preferred |
|---|---|---|---|
| total iron (expressed as $Fe_2O_3$): | 0.001–0.06% | 0.005–0.045% | 0.01–0.03% |
| % FeO: | 0–0.0040% | 0–0.0030% | 0.001–0.0025% |
| glass redox (FeO/total iron): | <=0.10 | <=0.06 | <=0.04 |
| cerium oxide: | 0–0.07% | 0–0.04% | 0–0.02% |
| antimony oxide: | 0.01–10% | 0.1–5% | 1–5% |
| $SO_3$: | 0.1–1.0% | 0.2–0.6% | 0.25–0.5% |
| $TiO_2$ | 0–1.0% | 0.005–0.4% | 0.01–0.04% |

In certain example embodiments, the antimony may be added to the glass batch in the form of one or more of $Sb_2O_3$ and/or $NaSbO_3$. Note also $Sb(Sb_2O_5)$. The use of the term antimony oxide herein means antimony in any possible oxidation state, and is not intended to be limiting to any particular stoichiometry.

In certain example non-limiting embodiments of this invention, the colorant portion may be substantially free of other colorants (other than potentially trace amounts). However, it should be appreciated that amounts of other materials (e.g., refining aids, melting aids, colorants and/or impurities) or colorants may be present in the glass in certain other embodiments of this invention without taking away from the purpose(s) and/or goal(s) of the instant invention. For instance, in certain example embodiments of this invention, the glass composition may be optionally substantially free of, or free of, one, two, three, four or all of: erbium oxide, nickel oxide, cobalt oxide, neodymium oxide, chromium oxide, and selenium. The phrase "substantially free" means no more than 2 ppm and possibly as low as 0 ppm of the element or material.

In view of the above, glasses according to certain example embodiments of this invention may achieve a neutral or substantially clear color and/or high visible transmission. In certain embodiments, resulting glasses according to certain example embodiments of this invention may be characterized by one or more of the following transmissive optical or color characteristics when measured at a thickness of from about 1 mm-6 mm (most preferably a thickness of about 3-4 mm; this is a non-limiting thickness used for purposes of reference only) (Lta is visible transmission %). It is noted that in the table below the a* and b* color values are determined per Ill. D65, 10 degree Obs. It is pointed out that the below optical characteristics are for purposes of example only and are not intended to be limiting.

TABLE 3

GLASS CHARACTERISTICS OF EXAMPLE EMBODIMENTS

| Characteristic | General | More Preferred | Most Preferred |
|---|---|---|---|
| Lta (Lt D65): | >=85% | >=90% | >=91% |
| % τe (ISO 9050): | >=85% | >=90% | >=91% |
| % FeO (wt. %): | <=0.004% | <=0.003% | <=0.0020% |
| L* (Ill. D65, 10 deg.): | 90–99 | n/a | n/a |
| a* (Ill. D65, 10 deg.): | −1.0 to +1.0 | −0.5 to +0.5 | −0.2 to 0.0 |
| b* (Ill. D65, 10 deg.): | 0 to +1.5 | +0.1 to +1.0 | +0.2 to +0.7 |

The aforesaid characteristics of the glass substrate 1 are for the glass substrate alone, not the overall solar cell or solar cell module. However, in other example embodiments of this invention, the glass may have a visible transmission lower than those reference above, and/or optical and/or color values outside the ranges referenced above. Of courses, glass with TCO may be used in applications other than solar cells according to different embodiments of this invention.

Once given the above disclosure many other features, modifications and improvements will become apparent to the skilled artisan. Such features, modifications and improvements are therefore considered to be a part of this invention, the scope of which is to be determined by the following claims:

What is claimed is:

1. A method of making float glass having a thin conductive electrode layer at a surface thereof, the method comprising:
    providing a glass batch including soda, lime, silica and antimony;
    causing molten glass from the batch to be provided on a top surface of a tin bath, causing antimony in the glass batch to diffuse downward in the molten glass toward the tin bath and into a tin oxide inclusive film at a surface where the molten glass meets the tin bath, the antimony changing electrical properties of the tin oxide inclusive film to make it more conductive, thereby causing a transparent conductive tin oxide inclusive film that is doped with antimony to be formed at the glass surface adjacent the tin bath forming a thin transparent conductive electrode layer as part of the glass; and wherein the antimony increases the number of electrons in the tin oxide inclusive film formed at the glass surface so as to result in the formation of a transparent conductive tin oxide inclusive film at the glass surface that was adjacent the tin bath.

2. The method of claim 1, wherein the antimony comprises antimony oxide.

3. The method of claim 1, wherein the antimony is added to the glass batch in the form of one or more of $Sb_2O_3$, $NaSbO_3$ and $Sb(Sb_2O_5)$.

4. The method of claim 1, wherein the antimony and/or oxide thereof makes up from about 1-5% of the glass batch.

5. The method of claim 1, wherein the resulting glass is provided in a solar cell so that the transparent conductive electrode of the glass functions as an electrode of the solar cell.

6. The method of claim 5, wherein the solar cell comprises another electrode, and wherein at least a photoelectric film is provided between at least the another electrode and the conductive oxide film.

7. The method of claim 1, wherein the glass comprises:

| Ingredient | wt. % |
| --- | --- |
| $SiO_2$ | 67-75% |
| $Na_2O$ | 10-20% |
| CaO | 5-15 % |
| total iron (expressed as $Fe_2O_3$) | 0.001 to 0.06% |
| cerium oxide | 0 to 0.07% |
| antimony oxide | 0.01 to 10%. |

8. The method of claim 1, wherein the glass has visible transmission of at least 90%, a transmissive a* color value of −1.0 to +1.0 and a transmissive b* color value of from 0 to +1.5.

9. The method of claim 1, wherein the glass has a redox value ($FeO/Fe_2O_3$) no greater than 0.06.

10. The method of claim 1, wherein the glass substrate has a redox value ($FeO/Fe_2O_3$) no greater than 0.04.

11. The method of claim 1, wherein the glass is substantially free of two or more of erbium oxide, nickel oxide, cobalt oxide, neodymium oxide, chromium oxide, cerium oxide and selenium.

12. The method of claim 1, wherein the glass includes at least twice as much antimony oxide as total iron oxide, by weight.

* * * * *